United States Patent
King et al.

(10) Patent No.: US 11,594,958 B2
(45) Date of Patent: Feb. 28, 2023

(54) DRIVER CIRCUITRY

(71) Applicant: Cirrus Logic International Semiconductor Ltd., Edinburgh (GB)

(72) Inventors: Eric J. King, Austin, TX (US); Axel Thomsen, Austin, TX (US); Anthony S. Doy, Austin, TX (US); Thomas H. Hoff, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/538,169

(22) Filed: Nov. 30, 2021

(65) Prior Publication Data

US 2022/0286046 A1    Sep. 8, 2022

Related U.S. Application Data

(63) Continuation of application No. 17/192,990, filed on Mar. 5, 2021, now Pat. No. 11,296,598.

(51) Int. Cl.
*H02M 3/07* (2006.01)
*H02M 3/156* (2006.01)

(52) U.S. Cl.
CPC ............. *H02M 3/07* (2013.01); *H02M 3/156* (2013.01)

(58) Field of Classification Search
None
See application file for complete search history.

(56) References Cited

U.S. PATENT DOCUMENTS 7,851,946 B2    12/2010   Oyama et al.
9,209,757 B1    12/2015   Thandri et al.
(Continued)

OTHER PUBLICATIONS

International Search Report and Written Opinion of the International Searching Authority, International Application No. PCT/GB2022/050192, dated Apr. 21, 2022.
(Continued)

*Primary Examiner* — Jeffery S Zweizig
(74) *Attorney, Agent, or Firm* — Jackson Walker L.L.P.

(57) ABSTRACT

Driver circuitry for driving a load based on an input signal, comprising: at least one variable boost stage comprising: first and second input nodes configured to receive a first voltage and a second voltage respectively; first and second flying capacitor nodes for connection to a flying capacitor therebetween; a network of switching paths for selectively connecting the first and second input nodes with the first and second flying capacitor nodes; an output stage for selectively connecting a driver output node to each of the first and second flying capacitor nodes; and a controller operable in a first boost mode to: control the output stage to selectively connect the driver output node to the first flying capacitor node; control the network of switching paths to switch connection of the second flying capacitor node between the first and second input nodes at a controlled duty cycle; and in a first charge top-up cycle, control the network of switching paths to connect the first input node to the first flying capacitor node during a phase of the controlled duty cycle in which the first input node is connected to the second flying capacitor node; wherein the frequency of the controlled duty cycle is greater than the frequency of the charge top-up cycle.

20 Claims, 12 Drawing Sheets

(56) References Cited

U.S. PATENT DOCUMENTS

| | | |
|---|---|---|
| 9,444,329 B2* | 9/2016 | Arno ................ H02M 3/158 |
| 9,652,013 B2 | 5/2017 | Muggler et al. |
| 10,826,452 B2 | 11/2020 | King et al. |
| 10,992,221 B2* | 4/2021 | Hukel ................ H02M 3/07 |
| 2006/0244513 A1 | 11/2006 | Yesn et al. |
| 2008/0088179 A1 | 4/2008 | Oyama et al. |
| 2009/0121782 A1 | 5/2009 | Oyama et al. |
| 2011/0102069 A1 | 5/2011 | Tsai et al. |
| 2014/0084890 A1 | 3/2014 | Philip |
| 2018/0376252 A1 | 12/2018 | King et al. |
| 2019/0312514 A1 | 10/2019 | Hukel |

OTHER PUBLICATIONS

Examination Report under Section 17, UKIPO, Application No. GB2104494.6, dated Sep. 27, 2021.

* cited by examiner

DRIVER CIRCUITRY

This application is a continuation of U.S. patent application Ser. No. 17/192,990, filed Mar. 5, 2021, which is incorporated by reference herein in its entirety.

TECHNICAL FIELD

The present disclosure relates to driver circuitry comprising charge pump circuits for the maintenance of charge.

BACKGROUND

Charge pump circuits are a type of DC-DC converter which use capacitors as energy storage device and are able to provide a power source at a higher or lower voltage than that obtained from an input source. Charge pump circuits are capable of high efficiencies, sometimes as high as 90-95%.

Charge pumps typically use one or more switching devices to control the connection of one or more capacitors to voltage sources and to one another, to typically obtain voltages other than the input voltage value. Charge pumps typically include a capacitor, known as a "flying capacitor", for transferring charge to a load. The switching device(s) are configured to control the charging and discharging of the flying capacitor in cycles to achieve the desired output voltage based on an input signal.

During charging and discharging cycles of the flying capacitor, charge can be lost over time due to current leakage and other non-ideal effects. This fluctuation or drift from the desired charge across the capacitor can lead to inefficiencies and inaccuracies in the level of power being provided to the load.

SUMMARY

According to a first aspect of the disclosure, there is provided driver circuitry for driving a load based on an input signal, comprising: at least one variable boost stage comprising: first and second input nodes configured to receive a first voltage and a second voltage respectively; first and second flying capacitor nodes for connection to a flying capacitor therebetween; a network of switching paths for selectively connecting the first and second input nodes with the first and second flying capacitor nodes; an output stage for selectively connecting a driver output node to each of the first and second flying capacitor nodes; and a controller operable in a first boost mode to: control the output stage to selectively connect the driver output node to the first flying capacitor node; control the network of switching paths to switch connection of the second flying capacitor node between the first and second input nodes at a controlled duty cycle; and in a first charge top-up cycle, control the network of switching paths to connect the first input node to the first flying capacitor node during a phase of the controlled duty cycle in which the first input node is connected to the second flying capacitor node; wherein the frequency of the controlled duty cycle is a greater than the frequency of the charge top-up cycle.

The frequency of the controlled duty cycle may be a multiple of the frequency of the charge top-up cycle.

The driver circuitry may further comprise the flying capacitor coupled between the first and second flying capacitor nodes.

The controller may be operable in a second boost mode to: control the output stage to switch connection of the driver output node to the second flying capacitor node; control the network of switching paths to switch connection of the first flying capacitor node between the first and second input nodes at the controlled duty cycle. The controller may be operable in a second charge top-up cycle to control the network of switching paths to connect the second input node to the second flying capacitor node during a phase of the controlled duty cycle in which the second input node is connected to the first flying capacitor node. The frequency of the controlled duty cycle may be greater than the frequency of the second charge top-up cycle.

The controller may be operable in a third mode to: control the network of switches to provide the first and second voltages at the first and second flying capacitor nodes respectively; and control the output stage to switch connection of the driver output node between the first flying capacitor node and the second flying capacitor node at the controlled duty cycle.

The first voltage may be greater than the second voltage.

The controller may be configured to control the network of switching paths in a charging mode and another mode. In the charging mode, the controller may be configured to selectively connect the flying capacitor in series between the first and second input nodes to be charged. In the other mode, the controller may be configured to selectively connect the flying capacitor in series between one of the first and second input nodes and a selected one of the first and second flying capacitor nodes.

The network of switching paths may comprise one or more of: a switching path for selectively connecting the first input node to the first flying capacitor node; a switching path for selectively connecting the first input node to the second flying capacitor node; a switching path for selectively connecting the second input node to the first flying capacitor node; and a switching path for selectively connecting the second input node to the second flying capacitor node.

The output stage may comprise a switching path for selectively connecting the first flying capacitor node to the driver output node, and/or a switching path for selectively connecting the second flying capacitor node to the driver output node.

The at least one variable boost stage may comprise first and second variable boost stages configured to drive the load in a bridge-tied-load configuration.

The controller may be operable to control the controlled duty cycle based on the input signal.

The at least one variable boost stage may comprise a DC-DC converter.

The driver circuitry may comprise an inductor connected to the driver output node for connection in series with the load.

The driver circuitry may further comprise the load.

In some embodiments, the load is a reactive load. In other embodiments, the load is a resistive load.

In some embodiments, the load is a transducer. The transducer may be at least one of an audio output transducer and a haptic output transducer. Alternatively, the transducer may be a piezoelectric or ceramic transducer.

According to another aspect of the disclosure, there is provided an electronic device comprising the driver circuitry described above.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Figure 1:
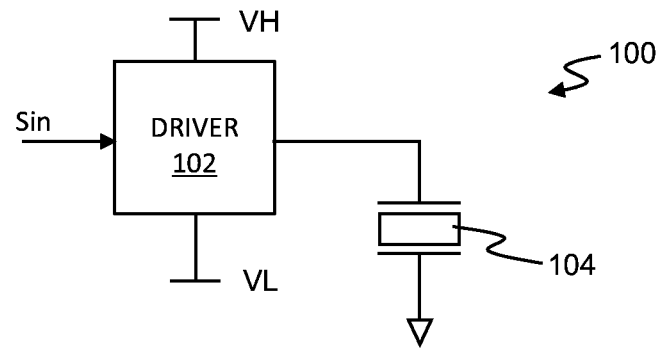
FIG. 1 is a diagram of single-ended driver circuitry for driving a load.

FIG. 1 is a schematic illustration of circuitry 100 comprising a driver 102 for driving a load 104, in this case a transducer. The driver 102 may receive an input signal Sin and generate a corresponding drive signal for driving the transducer. The input signal Sin may, for example, be an input audio or ultrasonic signal or haptic waveform or the like and may be received from upstream circuitry (not shown) such as upstream amplification and/or signal processing circuitry. The driver 102 drives the transducer 104 with the drive signal based on the input signal Sin. Where the load 104 is an output transducer, the driver 102 drives the load 104 to cause the transducer to produce a desired output, e.g. an audible, ultrasonic, or haptic output based on the input signal Sin.

The driver 102 may include a switching amplifier stage, e.g. a class-D amplifier stage or the like, for generating the drive signal. Switching amplifier stages can be relatively power efficient and thus can be advantageously used in some applications. A switching amplifier stage generally operates to switch an output node between defined high and low switching voltages, with a duty cycle that provides a desired average output voltage over the course of the duty cycle for the drive signal. To provide a desired output voltage range, the switching amplitude may be switched between the peak high and low voltages of the desired output range.

In at least some applications, for example for driving some piezoelectric transducers, it may be desirable to generate drive signals with relatively high amplitudes, for example with a peak-to-peak voltage range of the order of tens of volts or so. For instance, piezoelectric or piezo transducers or ceramic transducers are increasingly being proposed for use in some applications, for instance for audio, ultrasonic or haptics output, and may be considered as an alternative to conventional cone and voice-coil type speaker or resonant actuators or the like. Piezoelectric transducers may be advantageous in some applications, especially for portable electronics devices such as mobile telephones, laptop and tablet computers and the like, due to their thin form factor, which may be beneficial in meeting the demand for increasing functionality in such devices without significantly increasing their size. Piezoelectric transducers are also increasingly finding application as transducers for ultrasonic and range-finding systems. Piezoelectric transducers may also be used as input transducers or sensors in some applications.

At least some embodiments of the present disclosure relate to configuration of driver circuitry comprising at least one switching driver for generating a drive signal at a driver output node, where the drive signal can vary within an output voltage range. The switching driver is operable in a plurality of different operating modes, wherein, in each of the different operating modes, the output node is switched between two switching voltages that provide only part of the output voltage range, that is, the voltage range between the two switching voltages in a given mode forms only a part or a subset of the full output voltage range.

The switching driver thus switches between two defined switching voltages with a controlled duty cycle to provide a desired average output voltage, where the average output voltage can vary within a defined voltage range between a peak high voltage and a peak low voltage. However, rather than just switch between these peak high and low voltage levels of the output range, the switching driver of embodiments of the disclosure switches between two switching voltages which form a subset, or only part, of the full output range. Thus, the output node switches between two switching voltages that differ from one another by less than the full output range.

In effect, the switching driver may be considered to operate with variable voltage rails, where the voltage rails are controllably varied to provide different operating ranges in the different operating modes, where each of the operating ranges is only part of the full output range.

Figure 2:
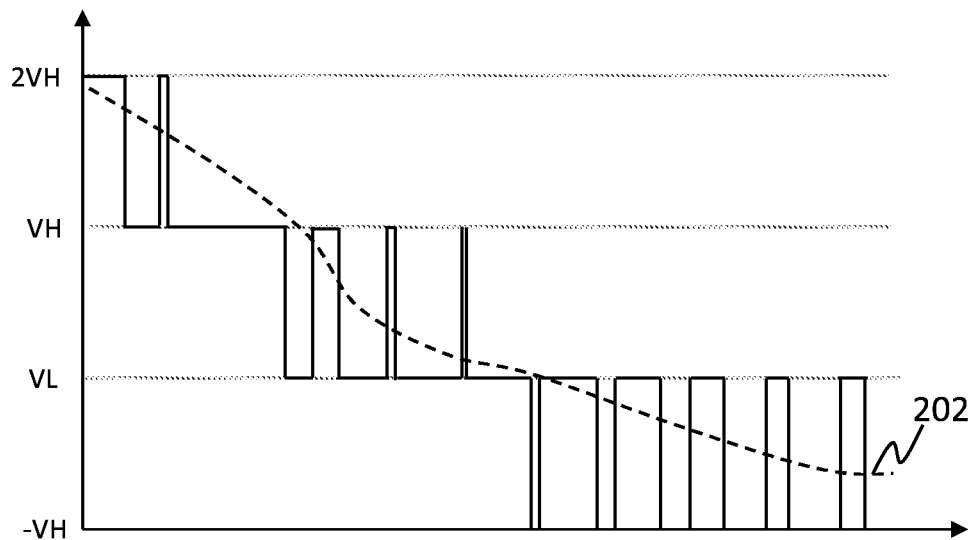
FIG. 2 is an example output waveform for the driver circuitry of FIG. 1.

FIG. 2 illustrates this principle. FIG. 2 illustrates the switching waveforms at an output node of a switching driver according to one example and the resulting average voltage 202 over a duty cycle, i.e. the desired voltage of the drive signal output from the switching driver. The driver 102 is provided with a supply voltage VH and a reference voltage VL, which for the purposes of this example is a ground reference or zero volts. The drive signal may vary within a full output range between a peak low voltage −VH and a peak high voltage 2VH. In this example, however, the switching driver is operable in different modes. In one mode of operation an output node of the switching driver may be switched between the peak low voltage −VH and a first intermediate voltage VL. In another mode of operation, the output node may be switched between the first intermediate voltage VL and a second intermediate voltage VH. In a further mode of operation, the output node may be switched between the second intermediate voltage VH and the peak high voltage 2VH.

To generate a drive signal with a voltage that is lower than the intermediate voltage VL, the output stage may operate in the mode that switches between VL and −VH. For a drive voltage which is greater than the first intermediate voltage VL, but lower than the second intermediate voltage, the output node may be switched between VL and VH, and if the desired voltage for the drive signal is above VH, the switching driver may operate in the mode to switch the voltage at the output node between VH and the peak high voltage 2VH. In each case, the duty cycle is controlled appropriately to provide the desired average voltage.

It can be seen from FIG. 2 that the full output range between −VH and 2VH is provided by three different operating modes. However, in other embodiments, there may be a different number of operating modes across a full output range of the switching output stage, for instance in some embodiments there may be just one or two operating modes or there may be more than three operating modes. The voltage ranges for the operating modes, defined by the switching voltages, may be defined so that the respective voltage ranges of the operating modes are contiguous and non-overlapping and collectively cover the whole of the full output range of the switching driver. In any embodiment, the magnitude of the voltage range of each of the operating modes, i.e. the voltage difference between each of the relevant two switching voltages: −VH and VL, VL and VH, or VH and 2VH; is the same as one another or different to one another.

The switching driver may be configured to receive a first (low-side) input voltage and a second (high-side) input voltage, for instance a supply voltage and ground or two supply voltages, which define an input voltage supply with a magnitude which is lower than the full peak-to-peak output voltage range of the switching driver. Operating in the different operating modes also means that the voltage difference between the switching voltages is less than the full output range of the switching driver, even when operating to provide a drive signal voltage near the peak high output voltage 2VH. In this way, the maximum voltage stress across components of the switching driver can be kept to a magnitude which is lower than, and in some implementations significantly lower than, the peak-to-peak output voltage range of the switching driver. This can advantageously allow the use of components, e.g. transistors such as. FETs, with a voltage tolerance which may be significantly lower than the peak-to-peak output voltage of the driver circuit.

The switching driver may comprise a variable boost, or level-shifting circuit, such as a charge pump, for providing some of the appropriate switching voltages for operation in the selected mode. The variable boost circuit may selectively positively boost (i.e. increase) the high-side input voltage and/or negatively boost (i.e. lower) the low-side input voltage to controllably vary at least one of the switching voltages for a mode of operation.

Figure 3:
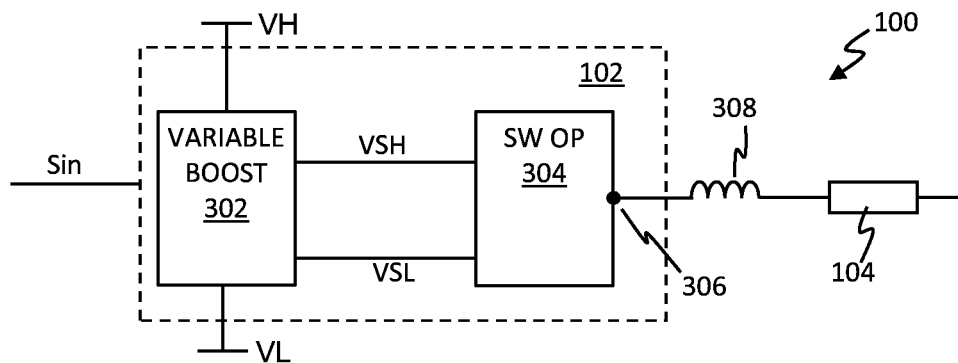
FIG. 3 is a block diagram of the driver circuitry of FIG. 1.

FIG. 3 illustrates an example of the driver circuitry 100 shown in FIG. 1 with a variable boost stage 302. The driver 102 comprises the variable boost stage 302 and a switching output stage 304. The variable boost stage 302 is configured to receive a high-side input voltage VH and a low-side input voltage VL. The switching output stage 304 receives high-side and low-side-switching voltages VSH and VSL from the variable boost stage and switches a driver output node 306 between these two switching voltages with a controlled duty cycle to provide a desired average output voltage.

The variable boost stage is operable to controllably vary the switching voltages VSH and VSL so as to provide the different modes of operation. In one example, the input voltages VH and VL, may be used as the switching voltages VSH and VSL in one mode. In one example the input voltage VH may be used as the low-side switching voltage VSL, with the variable boost stage being operable to generate a positively boosted higher voltage (e.g. 2VH) as the high-side switching voltage VSH. In one example VL may be used as the high-side switching voltage VSH, with the variable boost stage being operable to generate a negatively boosted lower voltage (e.g. −VH) as the low-side switching voltage VSL.

In some applications the load 104 could be a reactive load, such as a piezoelectric transducer. FIG. 3 also illustrates that there may be a series inductance 308 in the load path, e.g. the load 104 may be connected in series with an inductor 308. Especially for piezoelectric transducers, the capacitive nature of such transducers means that it may generally be beneficial to include an inductor in series with the transducer. The inductor 308 may help suppress the switching ripple at the switching frequency, whilst allowing the current to flow for the signal band of interest, e.g. at audio or ultrasonic frequencies.

Figure 4:
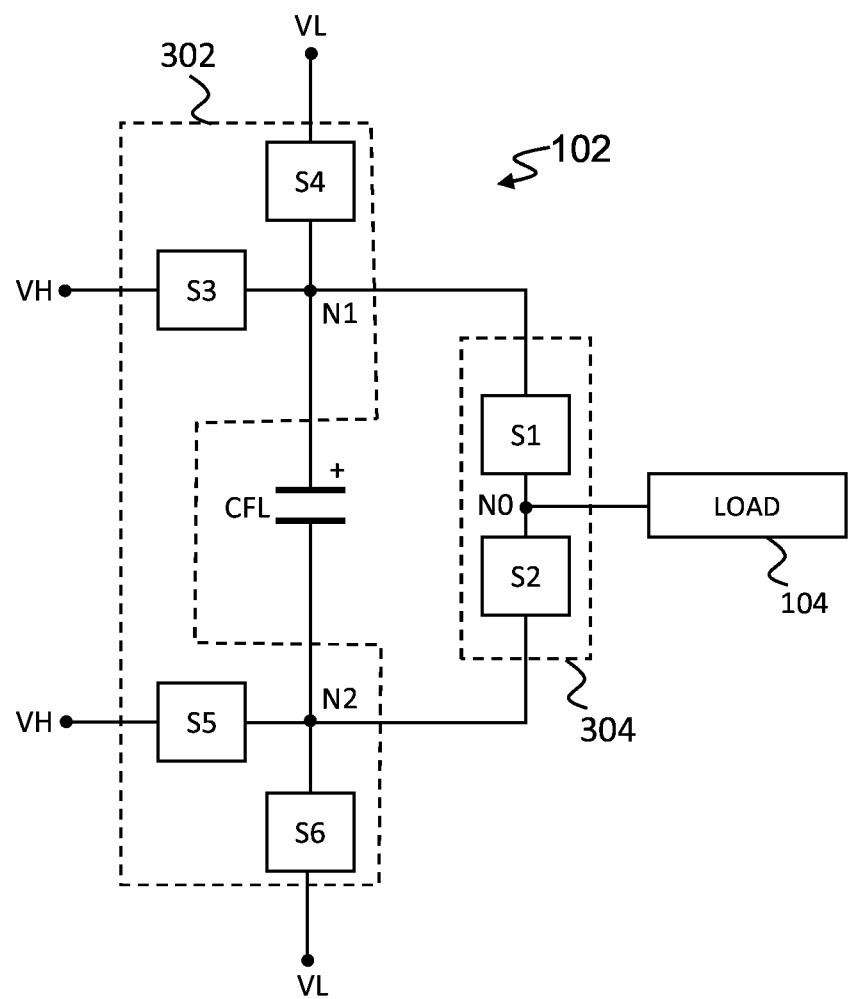
FIG. 4 is a schematic diagram of the driver circuitry of FIG. 1.

FIG. 4 illustrates an example implementation of the driver 102 shown in FIG. 3.

The output stage 304 comprises two switching paths S1 and S2 for selectively connecting the driver output node NO to first and second nodes N1, N2. In use, a flying capacitor CFL is coupled between the first and second nodes N1, N2 and so the first and second nodes N1, N2 will also be referred to herein as first and second flying capacitor nodes N1, N2.

The variable boost stage 302 is configured to selectively control the voltages at the first and second nodes N1 and N2 to enable the various modes of operation.

The variable boost stage 302 comprises a first set of switching paths S3, S4 and a second set of switching paths S5, S6. Switching paths S3 and S4 are provided to selectively connect a node N1 to the high-side input voltage VH or the low-side input voltage VL respectively. Likewise, switching paths S5 and S6 selectively connect a node N2 to the high-side input voltage VH or the low-side input voltage VL respectively.

It will be understood that the switching driver 102 may be implemented as an integrated circuit (IC), but in some embodiments the capacitor CFL may not be an integrated component and may be a separate component which is connected to the IC in use, i.e. the capacitor 308 may be off-chip. The capacitor 308 may therefore be connected between first and second capacitor nodes (not separately identified), which may be connected to suitable contacts of an IC for connection to an external capacitor.

In use, the driver circuit may be selectively operable in three different driver modes of operation, where the voltages at the variable boost nodes N1 and N2, and hence the switching voltages for the output stage 304 vary in each mode.

Figure 5:
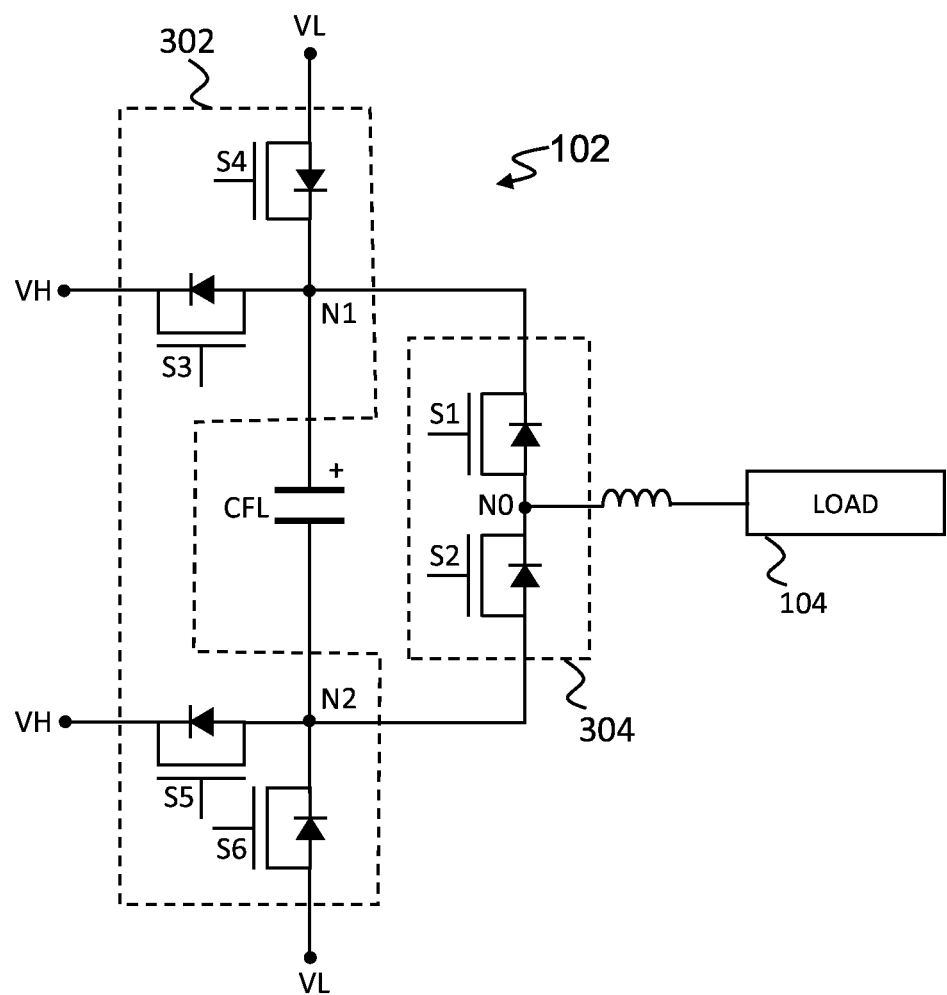
FIG. 5 is a transistor-level diagram of the driver circuitry of FIG. 4.

As described above, each of the switching paths of the variable boost stage 302 and the output stage 304 may be implemented by a suitable transistor, e.g. a suitable MOSFET. FIG. 5 illustrates an example of a switch driver such as described with respect to FIG. 4, wherein each of the switching paths is implemented by a FET.

In a first (non-boost) mode of operation the switching voltages may be VH and VL. In a second mode of operation the switching voltages may be VH and 2VH. In a third mode of operation the switching voltages may be VL and −VH. By swapping between the three modes of operation the driver 102 can provide a peak-to-peak voltage range between −VH and 2VH, even though the voltage supply range is between VL and VH. It will be appreciated that in embodiments described herein, VL is zero volts. In other embodiments, VL may be a reference voltage other than zero volts, such as a negative voltage.

Figure 6:
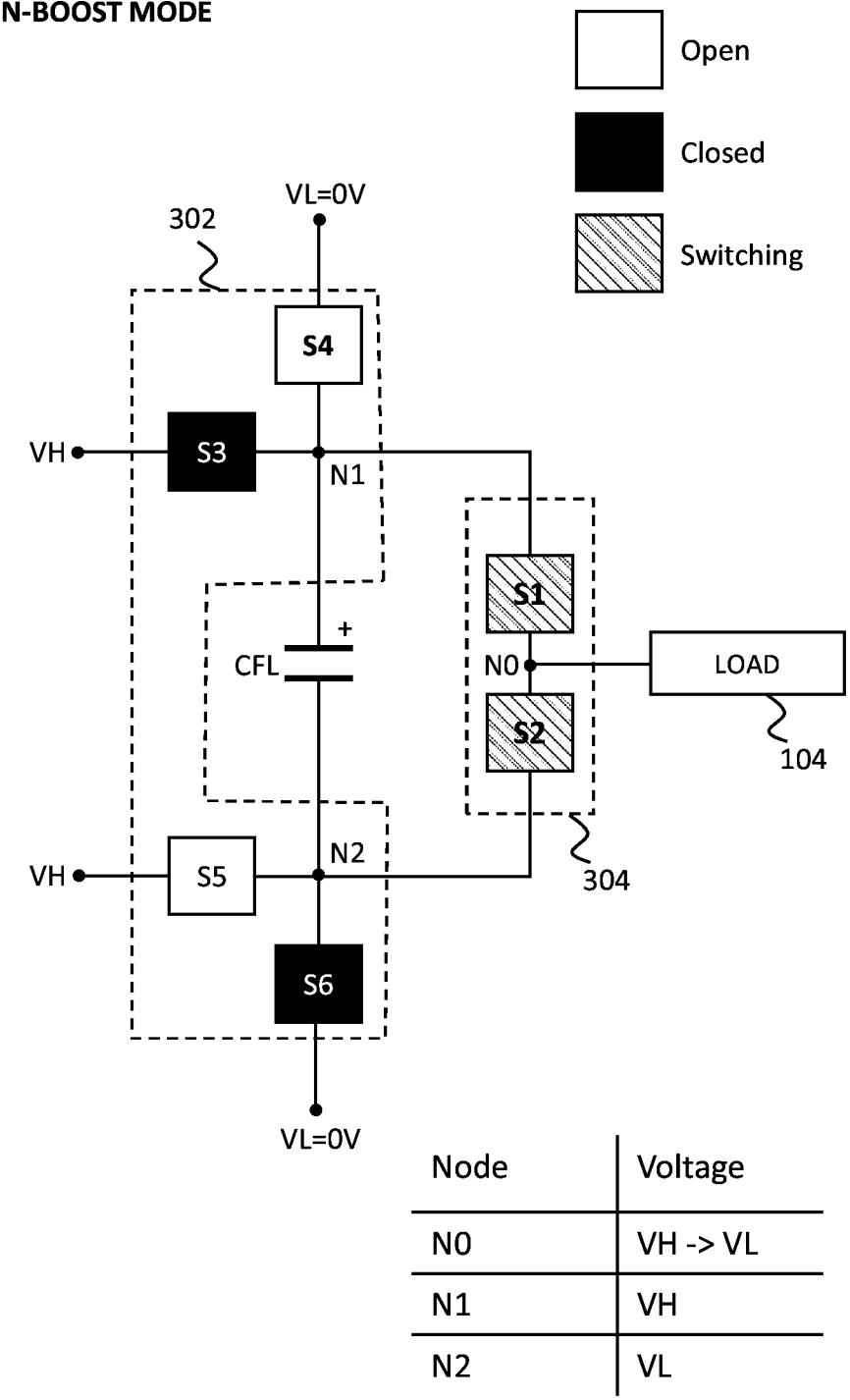
FIGS. 6 to 8 illustrate the driver circuitry of FIG. 4 in various modes of operation.
Figure 7:
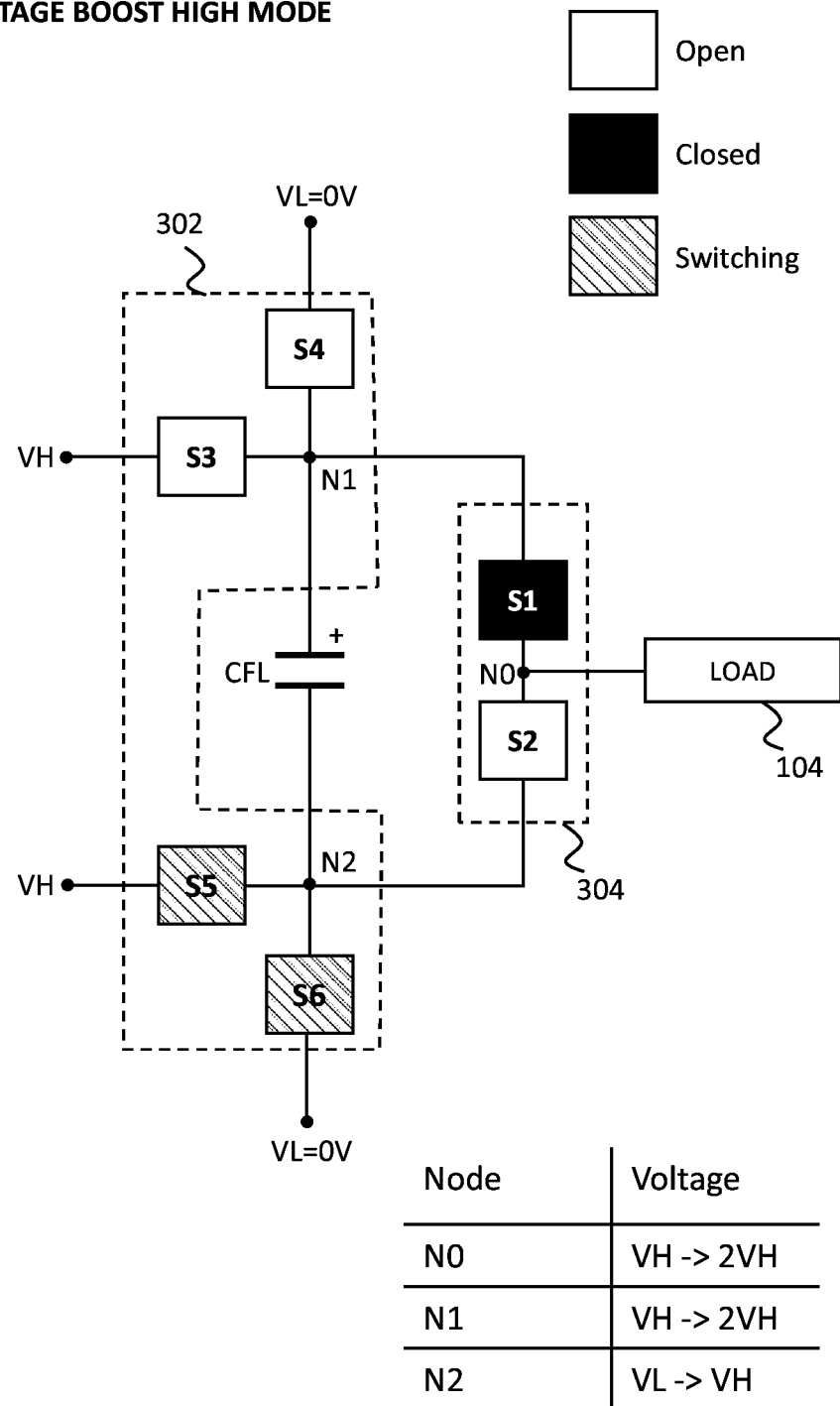
Figure 8:
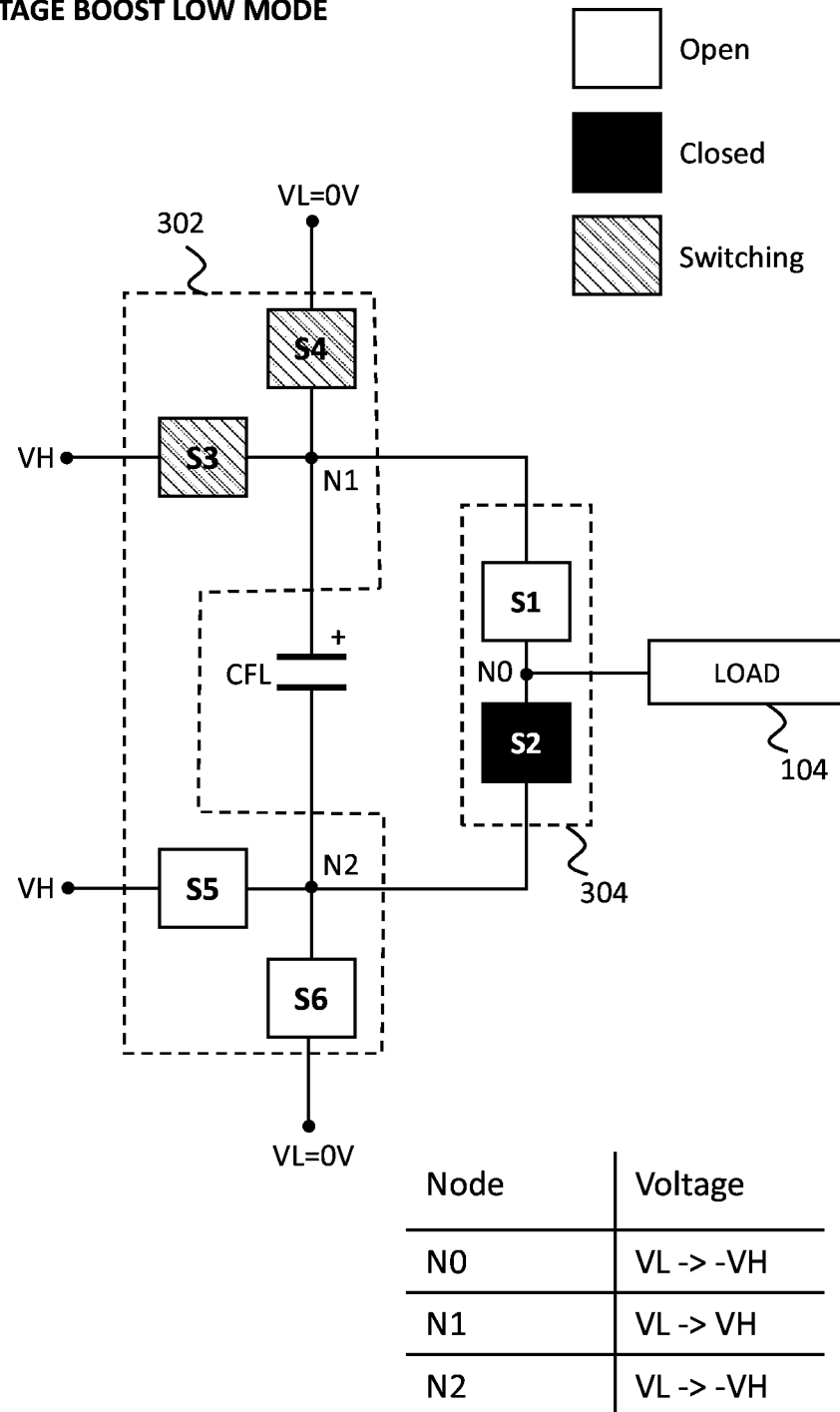

FIGS. 6 to 8 illustrate modes of operation of the driver 102. For simplicity, in the examples described, the low-side voltage VL is ground or zero volts. It will be appreciated, however, that the low-side voltage is not limited to zero volts and could be any voltage less than that of the high-side voltage VH.

Referring first to FIG. 6, to provide the first (non-boost) mode of operation the variable boost stage 302 may be operable in at least a first switch state, in which switching paths S1 and S2 may be closed (with switching path S4 open and switching path S3 closed) to connect the high-side input voltage VH to the first flying capacitor node N1, and the switching path S6 may be closed (with switching path S5 open) to connect the second flying capacitor node N2 to the low-side input voltage VL, i.e. zero volts in this example. This results in the flying capacitor nodes N1 and N2 being connected to the respective high-side and low-side input voltages VH, VL. Whilst in this first state, the output stage 304 can be controlled so that switching paths S1 and S2 alternately connect the driver output node 404 to first and second flying capacitor nodes N1, N2 with a duty cycle controlled to provide the desired average output voltage in the range 0V to VH.

In this first state of the first mode of operation, the capacitor 308 is thus also connected between the high-side and low-side input voltages VL, VH and thus is charged to the difference between VL and VH, i.e. VH.

As, in this first state of the first mode, the flying capacitor nodes N1 and N2 are connected to the respective high-side and low-side input voltages VL, VH, the load current can be supplied from the input supply to the variable boost stage 302.

It will be noted that, in this first mode of operation the maximum voltage difference across any of switching paths is equal to the magnitude of the input voltage supply, i.e. the voltage difference between the high-side and low-side input voltages VH, VL. The voltages at the flying capacitor nodes N1 and N2 are VH and VL=0V respectively.

Referring now to FIG. 7, to provide the second (boost high) mode of operation, the flying capacitor CFL is first charged to VH. Switching paths S3, S4 are then opened and the switching path S1 is closed such that the voltage at the output node NO is that of the voltage at the first flying capacitor node N1.

Whilst in this state, switching paths S5 and S6 are controlled to alternately connect the second flying capacitor node N2 to the high- and low-side voltages VH, VL. When the second flying capacitor node N2 is connected to the high-side voltage VH, the voltage at the first flying capacitor node N1 (and thus the output node NO) is boosted to 2VH. When the second flying capacitor node N2 is connected to the low-side voltage VH, the voltage at the first flying capacitor node N1 is at VH.

The switching paths S5 and S6 can be controlled to switch alternately at a controlled duty cycle to provide the desired average output voltage within the range VH and 2VH.

Referring now to FIG. 8, to provide the third (boost low) mode of operation, the variable boost stage 302 is operable in a switch state in which switching path S4 is first closed (and switching path S3 open) connecting the first flying capacitor node N1 to the low-side voltage VL, i.e. 0V. the switching path S2 is closed such that the voltage at the output node NO is that of the voltage at the first flying capacitor node N2, i.e. 0V. Switching paths S5, S6 are open and the voltage of the capacitor CFL, which is charged to VH, negatively boosts, or lowers, the voltage at the second flying capacitor node N2 to −VH.

Whilst in this state, switching paths S3 and S4 may then be controlled to alternately connect the first flying capacitor node N1 to the high- and low-side voltages VH, VL. Thus, when the first flying capacitor node N1 is connected to the high-side voltage VH, the voltage at the second flying capacitor node N2 (and thus the output node N0) is VL. When the first flying capacitor node N1 is connected to the low-side voltage VL=0V, the voltage at the second flying capacitor node N2 is boosted to VL−VH=−VH.

The switching paths S3 and S4 can be controlled to switch alternately at a controlled duty cycle to provide the desired average output voltage within the range VL to −VH (i.e. 0V to −VH).

It will be understood that for driving a transducer with a drive signal based on an input signal, such as an audio signal, the required drive voltage of the output stage will vary with the input signal. High output voltages, such as enabled in the second mode of operation may only be required for relatively large amplitude drive signals and for only part of the input signal cycle, when the relevant drive signal is near its peak. Thus, in normal operation, the second mode may be expected to be used for only parts of the signal cycle of the input signal, and for the switching driver circuit to be operating in the second mode of operation, e.g. in the range VH to 2VH, the required drive signal will have passed through the voltage range of the first mode, e.g. VL to VH. Thus prior to operating in the second mode there will have been a period of operation in the first mode and thus the capacitor CFL will have been charged during such operation in the first mode.

The size of the capacitor CFL may thus be selected, based on the reactive load to be driven, such that a single charge of the capacitor provides sufficient charge for the driving of the reactive load over the course of a signal cycle for the input signal.

It will thus be understood that the variable boost stage 302 is operable to controllably vary the voltages at the flying capacitor nodes N1 and N2 to provide different switching voltages in the different modes of operation. One of switching voltages in the second and third modes of operation is selectively boosted by the voltage of the capacitor CFL, which is charged during operation in the first mode by the input voltage, i.e. the voltage between the high-side voltage and the low-side voltage, VBST and ground in this example. Each of the operating modes therefore involves switching voltages that differ from one another by a magnitude equal to the input voltage supply for the variable boost stage 302, i.e. the difference between the high-side and low-side input voltages.

It will also be understood that the maximum voltage stress across any of the individual switching paths can be limited to be substantially equal to the input voltage supply. Typically, each switching path may be implemented with a transistor, e.g. a MOSFET, as a switch and this means that a drain-source voltage tolerance of the transistor need only be sufficient to withstand a voltage of magnitude equal to the input voltage supply to the variable boost stage.

When operating in the second or third mode boost states, the load current will be drawn from the capacitor CFL. If the capacitance of the capacitor CFL is relatively large and the load for the output stage is a reactive load, the capacitor CFL may be able to provide the charge needed with a single charge pumping cycle. Where the output stage 204 drives an inductor 308 in the output path, lossless movement of charge between the load and the capacitor CFL may be achievable for charge recovery.

However, in many instances, this lossless movement of charge is not achievable. For example when the load 104 is a resistive load and/or if the inductor 308 is not provided in the output path charge may be lost to the load 104. In such cases, the voltage at either of the first and second flying capacitor nodes N1, N2 may drift from the original set voltage due to charge lost from the capacitor CFL.

Figure 9:
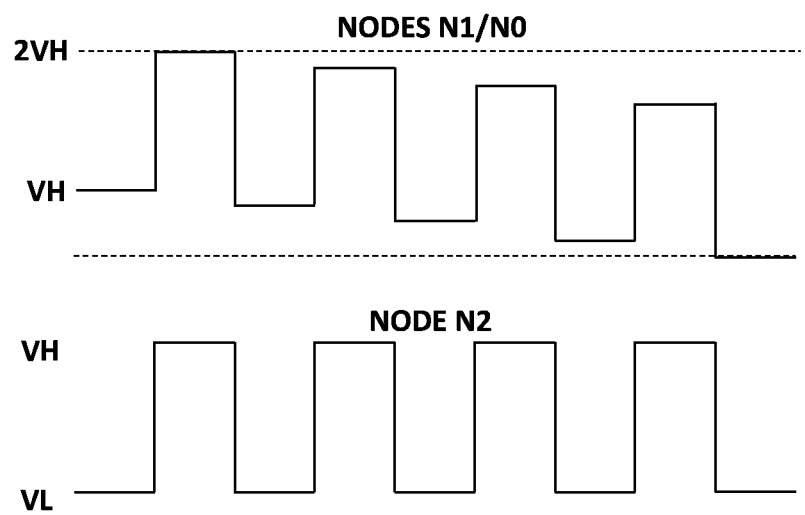
FIG. 9 is a timing diagram for the operation of the driver circuitry shown in FIG. 8.
Figure 10:
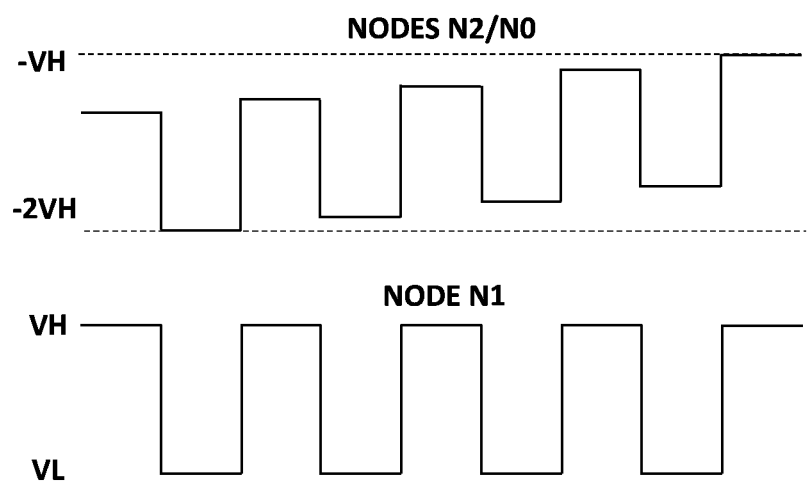
FIG. 10 is a timing diagram for the operation of the driver circuitry shown in FIG. 9.

FIGS. 9 and 10 illustrate this problem for the respective second and third operation modes described above.

FIG. 9 is a timing diagram for the second (voltage boost high) mode described with reference to FIG. 7. As described above, node N2 is switched between VL and VH at a controlled duty cycle. Four cycles of the alternative switching of switching devices S5 and S6 are shown in FIG. 10. During successive cycles of switching of the node N2, charge is lost from the capacitor CFL and the voltage at the first flying capacitor node N1 (and therefore the output node N0) starts to drift from the initial output range of VH-2VH. It can be seen that this drift becomes larger in successive cycles due to charge being lost in each cycle of switching of the switching paths S5 and S6.

FIG. 10 is a timing diagram for the third (voltage boost low) mode described with reference to FIG. 8. As described above, the first flying capacitor node N1 is switched between VL and VH at a controlled duty cycle. Four cycles of the alternative switching of switching devices S3 and S4 are shown in FIG. 10. During successive cycles of switching of the node N2 between VH and VL, charge (in this case negative charge) is lost from the capacitor CFL and the voltage at the second flying capacitor node N2 (and therefore the output node N0) starts to increase from the initial voltage range of −VH to −2VH to a higher voltage range. It can be seen that this drift becomes larger in successive cycles due to charge being lost in each cycle of switching of the switching paths S3 and S4.

Embodiments of the present disclosure aim to address or at least ameliorate the above described problems by introducing a top-up (or recharge) cycle (or phase) in which one or more switching devices of the variable boost stage are controlled to apply a voltage to one of the flying capacitor nodes N1, N2, in doing so restoring charge across the capacitor CFL.

Figure 11:
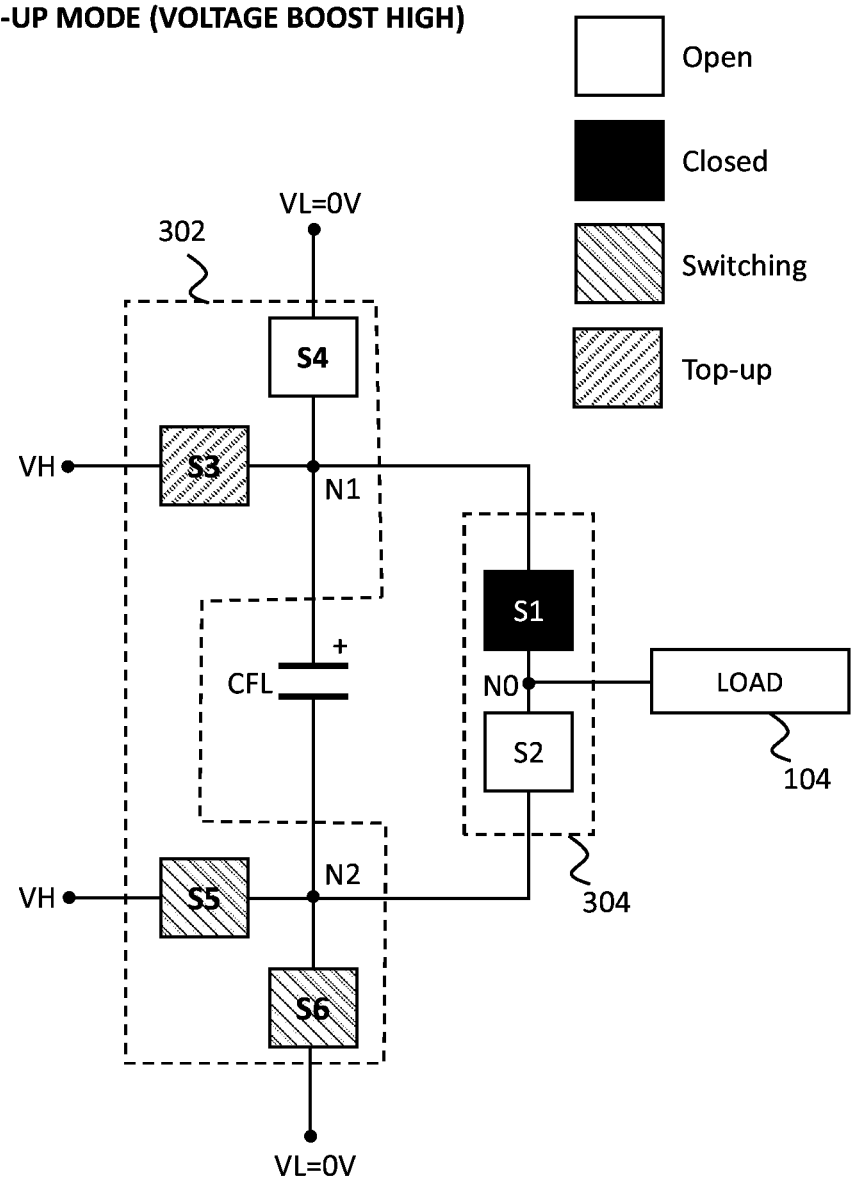
FIG. 11 illustrates the driver circuitry of FIG. 4 during a top-up cycle according to embodiments of the present disclosure.
Figure 12:
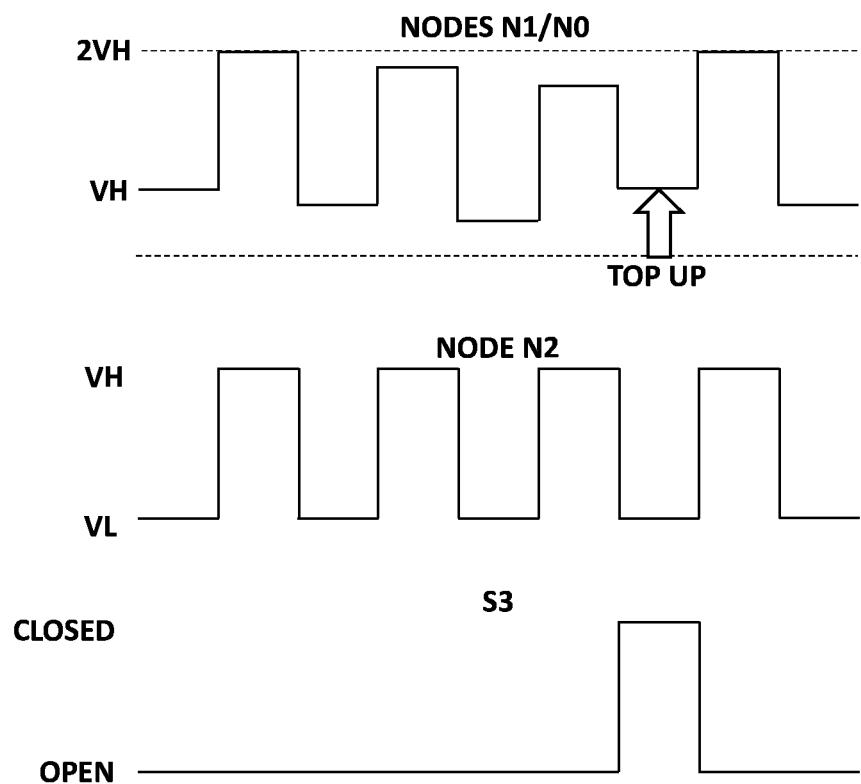
FIG. 12 is a timing diagram for the operation of the driver circuitry shown in FIG. 11.

FIGS. 11 and 12 illustrate an example implementation of such top-up cycle when the driver 102 is operating in the second (voltage boost high) mode of operation. As described above, the flying capacitor CFL is first charged to VH such that the voltage at the first flying node N1 is VH. Switching paths S3, S4 are then opened and the switching path S1 is closed such that the voltage at the output node N0 is that of the voltage at the first flying capacitor node N1, i.e. VH.

Whilst in this state, switching paths S5 and S6 are controlled to alternately connect the second flying capacitor node N2 to the high- and low-side voltages VH, VL. When the second flying capacitor node N2 is connected to the high-side voltage VH, the voltage at the first flying capacitor node N1 (and thus the output node N0) is boosted to 2VH. When the second flying capacitor node N2 is connected to the low-side voltage VH, the voltage at the first flying capacitor node N1 is at VH.

Again, as with the method described with reference to FIG. 8, the switching paths S5 and S6 are controlled to switch alternately at a controlled duty cycle to provide the desired average output voltage within the range VH and 2VH.

In contrast to the above technique, however, to restore charge lost across the capacitor CFL, the high-side voltage VH is applied to the first flying capacitor node N1, for example by closing the switching path S3. The high-side voltage VH is applied at the first flying capacitor node N1 during the phase of the controlled duty cycle in which the second flying capacitor node N2 is connected to the low-side voltage VL by switching path S6.

In doing so, since the voltage at the second flying capacitor node N2 is at VL and the voltage at the first flying capacitor node N1 is also at VH, the voltage drop across the capacitor CFL is VH−VL=VH (since VL=0V). When the switching devices S5 and S6 are then switched, the switching device S5 connects the high-side voltage VH to the second flying capacitor node N2, boosting the voltage at the first flying capacitor node N1 to 2VH, thus removing the drift and restoring the voltage range at the output driver node N0 between VH and 2VH.

Figure 13:
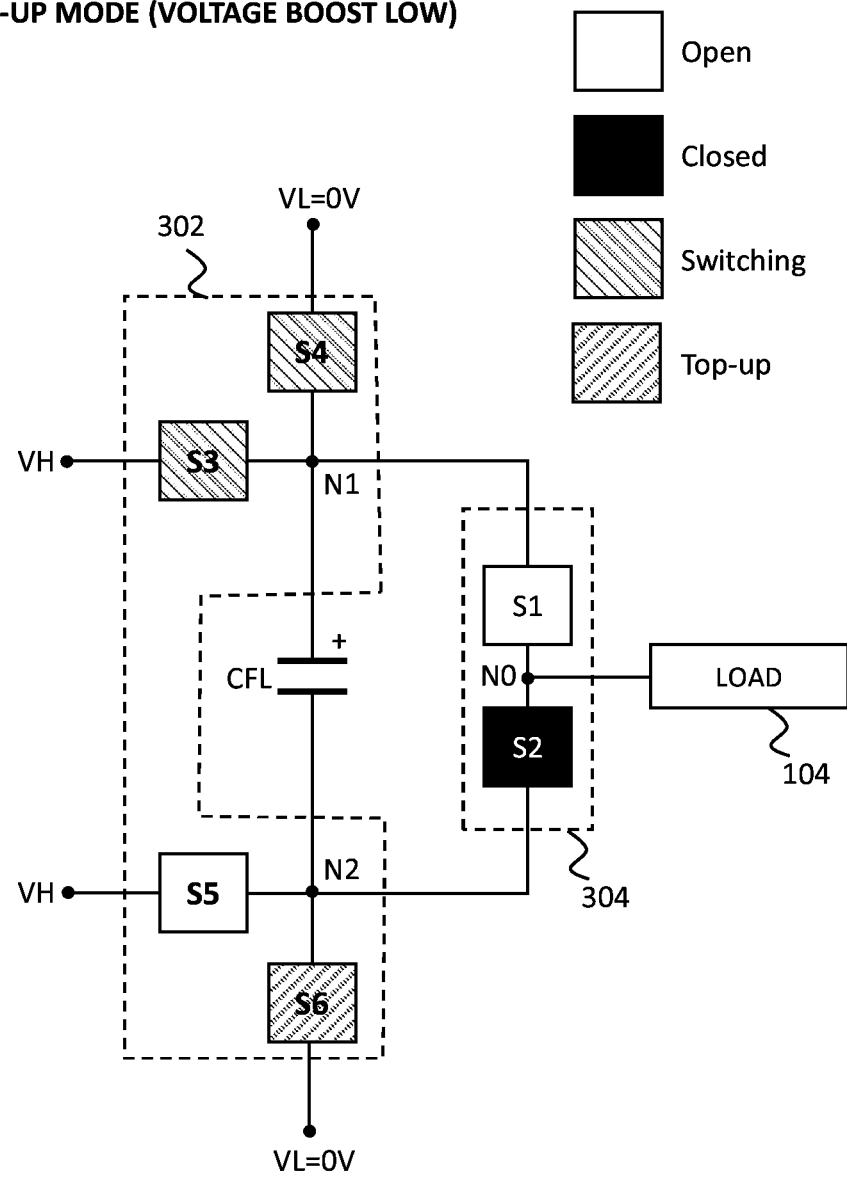
FIG. 13 illustrates the driver circuitry of FIG. 4 during a top-up cycle according to embodiments of the present disclosure.
Figure 14:
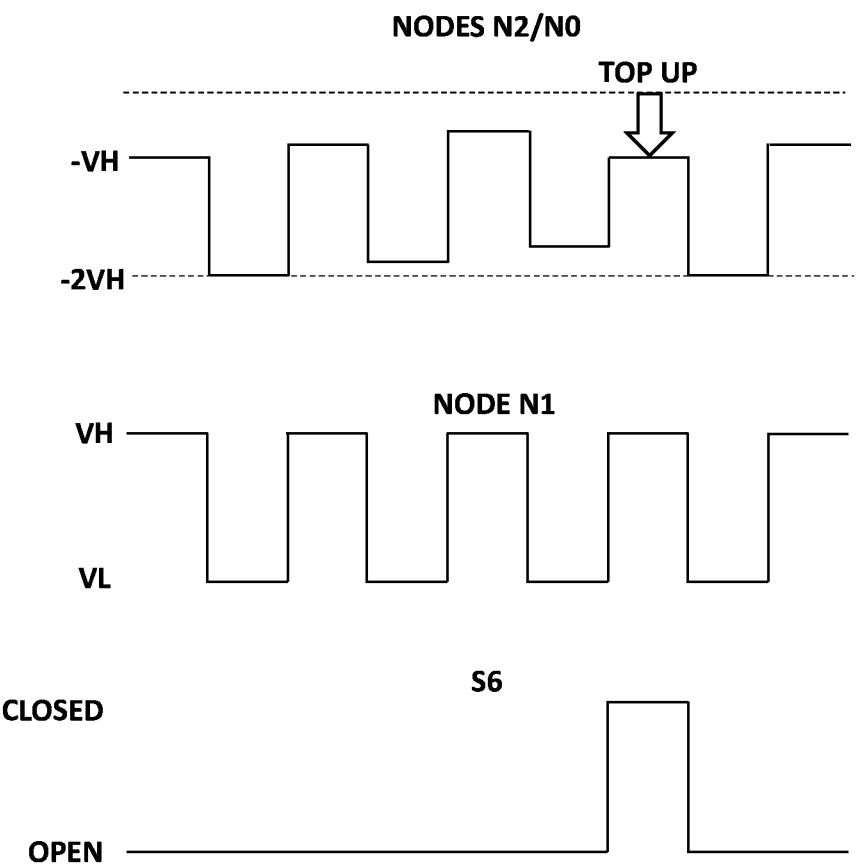
FIG. 14 is a timing diagram for the operation of the driver circuitry shown in FIG. 13.

FIGS. 13 and 14 illustrate an example implementation of a top-up or recharge cycle for the driver 102 during the second (voltage boost high) mode of operation. Again, as described above, the voltage across the flying capacitor CFL is initially VH. With switching paths S3, S4 opened, application of the low-side voltage at the first flying capacitor node N1 boosts the voltage at the second flying capacitor node N2 to −VH. The switching path S1 is closed such that the voltage at the output node N0 is that of the voltage at the second flying capacitor node N2, i.e. −VH.

Whilst in this state, switching paths S3 and S4 are controlled to alternately connect the first flying capacitor node N1 to the high- and low-side voltages VH, VL. When the first flying capacitor node N1 is connected to the high-side voltage VH, the voltage at the second flying capacitor node N2 (and thus the output node N0) is at VL, i.e. 0V. When the first flying capacitor node N1 is connected to the low-side voltage VH, the voltage at the second flying capacitor node N2 is at −VH.

As with the method described with reference to FIG. 9, the switching paths S5 and S6 are controlled to switch alternately at a controlled duty cycle to provide the desired average output voltage within the range VL to −VH.

In contrast to the above technique, however, to restore charge lost across the capacitor CFL, the low-side voltage VL may be applied to the second flying capacitor node N2, for example by closing the switching path S6.

The low-side voltage VL is applied at the second flying capacitor node N2 during the phase of the controlled duty cycle in which the first flying capacitor node N1 is connected to the high-side voltage VH by switching path S6. In doing so, since the voltage at the first flying capacitor node N1 is at VH and the voltage at the second flying capacitor node N2 is also at VL, the voltage drop across the capacitor CFL is restored to VH−VL=VH (since VL=0V). When the switching devices S3 and S4 are then alternately switched, the switching device S4 connects the low-side voltage VL to the first flying capacitor node N1, boosting the voltage at the second flying capacitor node N2 to −VH, thus removing the drift and restoring the voltage range at the output driver node N0 between VL and −VH.

Thus, embodiments of the present disclosure utilise switching devices in the variable boost stage 302 not currently being used for controlled duty cycle switching, to top-up charge across the flying capacitor CFL.

In the example timing diagrams shown in FIGS. 12 and 14, the top-up cycle is provided after four cycles of the controlled duty cycle. However, it will be appreciated that the top-up cycle could be implemented more often or less often depending on conditions at the driver 102 or the load 104. The top-up cycle may be implemented periodically or aperiodically during switching of the switching devices S3, S4, S5, S6. For example, the top-up cycle may occur every 2N cycles of the controlled duty cycle, where N is the number of duty cycles. For example, the frequency of the top-up cycle may be a multiple of the frequency of the controlled duty cycle. For example, the frequency of the top-up cycle may be an even multiple of the frequency of the controlled duty cycle. For example, if the frequency of the controlled duty cycle is 2 MHz, the frequency of the top-up cycle may be 1 MHz or 500 kHz or 400 kHz or 200 kHz.

In some embodiments, the top-up cycle may be implemented open loop. In other words, frequency of the top-up cycle may be pre-set based on one or more characteristics of the driver 102 or circuit components thereof and/or one or more characteristics of the load 104.

In some embodiments, the top-up cycle may be implemented closed loop. For example, the top-up cycle itself may be triggered by one or more conditions. For example, the frequency and/or duration of the top-up cycle may be controlled based on one or more conditions. The one or more conditions may comprise, for example, a predetermined drift in the output voltage range at the output node N0, a change in current through the load 104 or the like. The one or more conditions may relate to energy stored in the flying capacitor CFL. The voltage both on the load and on the capacitor holding the boosted voltage may be measured to estimate the total energy in the system. If the total energy exceeds a target energy (predetermined energy level), the top-cycle may be triggered. Otherwise, the top-up cycle may not be triggered. It will be appreciated that this closed loop top-up is particularly applicable to reactive loads, such as a piezoelectric transducer.

Embodiments described above provide examples of a single-ended driver 102, but it will be understood that in some implementations a load may be driven in a bridge-tied-load configuration.

Figure 15:
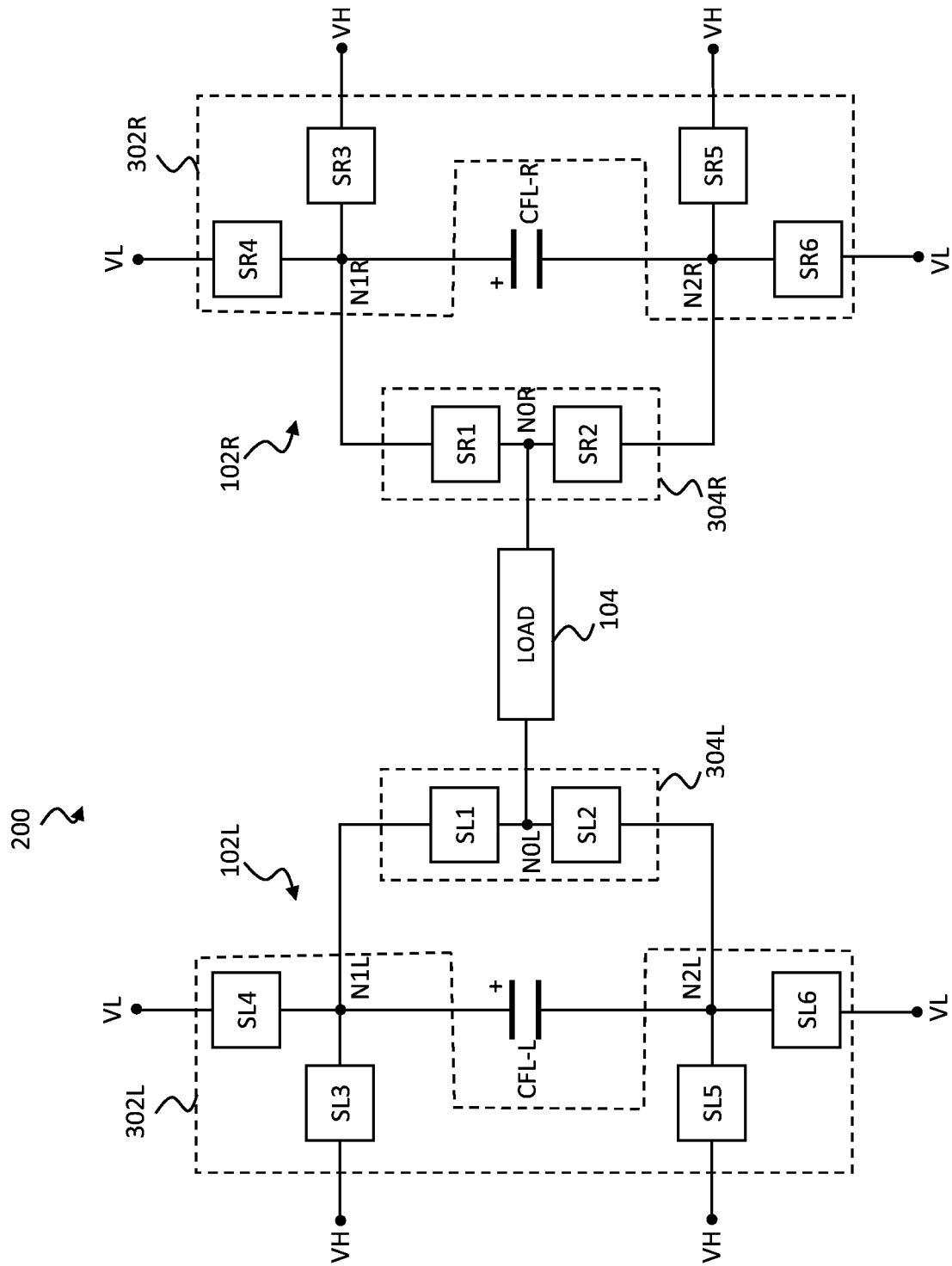
FIG. 15 is a schematic diagram of driver circuitry in a bridge-tied-load configuration.

FIG. 15 illustrates an example of driver circuitry 200 for driving a bridge-tied-load (BTL). FIG. 2 illustrates that each side of the load 104 is connected to a respective driver 102L and 102R. Each of the drivers 102L, 102R is similar in construction to the driver 102 of FIG. 4. Components of the driver 102L on the left of FIG. 15 have been provided with similar reference numerals suffixed by the letter L to denote similar components to those of the driver 120 of FIG. 4. Likewise, components of the driver 102R on the right of FIG. 15 have been provided with similar reference numerals suffixed by the letter R to denote similar components to those of the driver 120 of FIG. 4.

Each of the drivers 102L, 102R may be controlled in one or more operating modes (such as the first, second, and third operation modes described above) in a similar manner to the driver 102 of FIG. 4, each controlled with controlled duty cycles so as the control the voltage across the load 104. The duty cycle of switching may be controlled based on an input signal. The switching may be controlled by PWM or PDM switching signals based on the input signal as will be understood by one skilled in the art. The drivers 102L, 102R can thus be seen as generating respective first and second drive signals which are components of a differential driving signal for driving the load 104.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. Driver circuitry for driving a load, comprising:
at least one variable boost stage comprising:
first and second flying capacitor nodes for connection to a flying capacitor therebetween;
a network of switching paths for selectively connecting a first voltage and a second voltage with the first and second flying capacitor nodes;
an output stage for selectively connecting a driver output node to each of the first and second flying capacitor nodes; and
a controller operable in a first boost mode to:
control the output stage to selectively connect the driver output node to the first flying capacitor node;
control the network of switching paths to switch connection of the second flying capacitor node between the first and second voltages at a controlled duty cycle; and
in a first charge top-up cycle, control the network of switching paths to connect the first voltage to the first flying capacitor node during a phase of the controlled duty cycle in which the second voltage is connected to the second flying capacitor node.

2. Driver circuitry of claim 1, wherein a frequency of the controlled duty cycle is greater than a frequency of the charge top-up cycle.

3. Driver circuitry of claim 2, wherein the frequency of the controlled duty cycle is a multiple of the frequency of the charge top-up cycle.

4. Driver circuitry of claim 1, further comprising:
the flying capacitor coupled between the first and second flying capacitor nodes.

5. Driver circuitry of claim 1, wherein the at least one variable boost stage comprises:
first and second input nodes configured to receive the first voltage and the second voltage respectively.

6. Driver circuitry of claim 1, wherein the controller is operable in a second boost mode to:
control the output stage to switch connection of the driver output node to the second flying capacitor node;
control the network of switching paths to switch connection of the first flying capacitor node between the first and second voltages at the controlled duty cycle; and
in a second charge top-up cycle, control the network of switching paths to connect the second voltage node to the first flying capacitor node during a phase of the controlled duty cycle in which the second voltage is connected to the first flying capacitor node;
wherein the frequency of the controlled duty cycle is greater than a frequency of the second charge top-up cycle.

7. Driver circuitry of claim 1, wherein the controller is operable in a third mode to:
control the network of switches to provide the first and second voltages at the first and second flying capacitor nodes respectively; and
control the output stage to switch connection of the driver output node between the first flying capacitor node and the second flying capacitor node at the controlled duty cycle.

8. Driver circuitry of claim 1, wherein the first voltage is greater than the second voltage.

9. Driver circuitry of claim 1, wherein the controller is configured to control the network of switching paths:
in a charging mode, to selectively connect the flying capacitor in series between the first and second voltages to be charged; and
in another mode, selectively connect the flying capacitor in series between one of the first and second voltages and a selected one of the first and second flying capacitor nodes.

10. Driver circuitry of claim 1, wherein said network of switching paths comprises:
a switching path for selectively connecting the first voltage to the first flying capacitor node;
a switching path for selectively connecting the first voltage to the second flying capacitor node;
a switching path for selectively connecting the second voltage to the first flying capacitor node;
a switching path for selectively connecting the second voltage to the second flying capacitor node.

11. Driver circuitry of claim 1, wherein the output stage comprises:
a switching path for selectively connecting the first flying capacitor node to the driver output node;
a switching path for selectively connecting the second flying capacitor node to the driver output node.

12. Driver circuitry of claim 1, wherein the at least one variable boost stage comprises first and second variable boost stages configured to drive the load in a bridge-tied-load configuration.

13. Driver circuitry of claim 1, wherein the controller is operable to control the controlled duty cycle based on an input signal.

14. Driver circuitry of claim 1, wherein the at least one variable boost stage comprises a DC-DC converter.

15. Driver circuitry of claim 1, further comprising an inductor connected to the driver output node for connection in series with the load.

16. Driver circuitry of claim 1, further comprising the load.

17. Driver circuitry of claim 16, wherein the load is a transducer.

18. Driver circuitry of claim 17, wherein the transducer is at least one of an audio output transducer and a haptic output transducer.

19. Driver circuitry of claim 17, wherein the transducer is piezoelectric or ceramic transducer.

20. An electronic device comprising the driver circuitry of claim 1.

* * * * *